No. 793,526. PATENTED JUNE 27, 1905.
G. C. & C. E. JOHNSON.
DUST SPRAYING MACHINE.
APPLICATION FILED SEPT. 21, 1903.
3 SHEETS—SHEET 1.
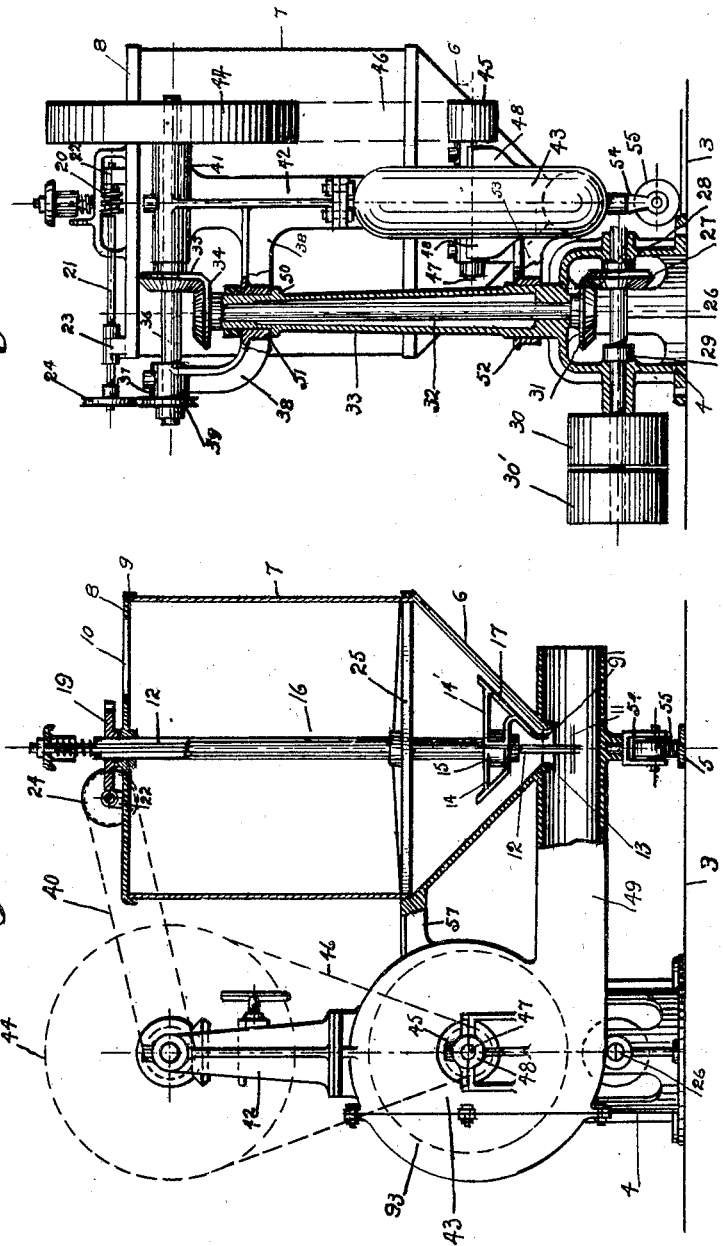
WITNESSES:
INVENTORS
George C. Johnson and Charles E. Johnson.
BY
Arthur C. Brown
ATTORNEY No. 793,526. PATENTED JUNE 27, 1905.
G. C. & C. E. JOHNSON.
DUST SPRAYING MACHINE.
APPLICATION FILED SEPT. 21, 1903.
3 SHEETS—SHEET 2.
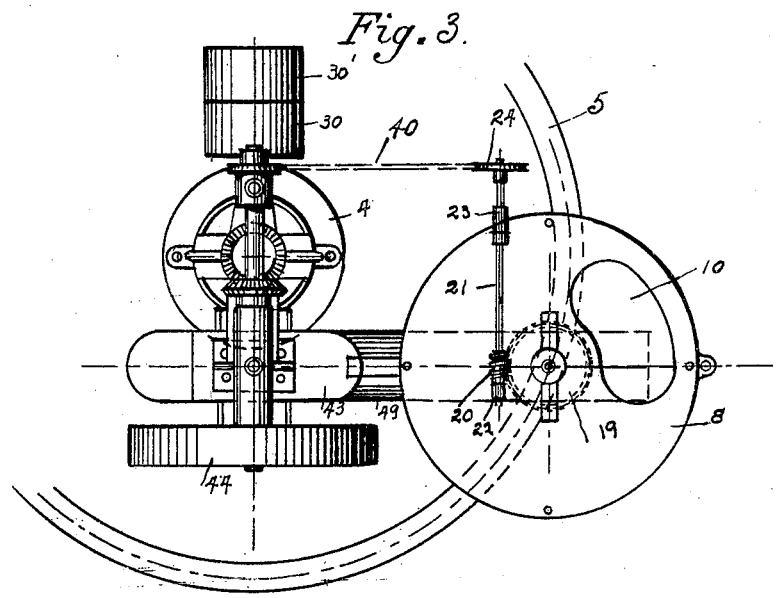
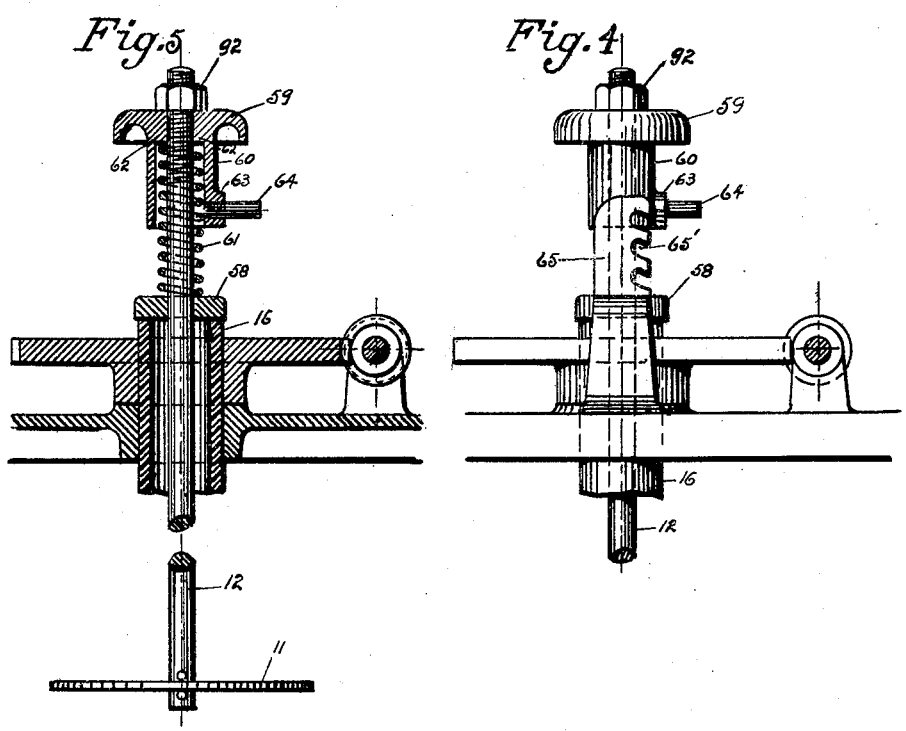
WITNESSES:
INVENTORS
George C. Johnson & Charles E. Johnson
BY
ATTORNEY.

No. 793,526. PATENTED JUNE 27, 1905.
G. C. & C. E. JOHNSON.
DUST SPRAYING MACHINE.
APPLICATION FILED SEPT. 21, 1903.
3 SHEETS—SHEET 3.
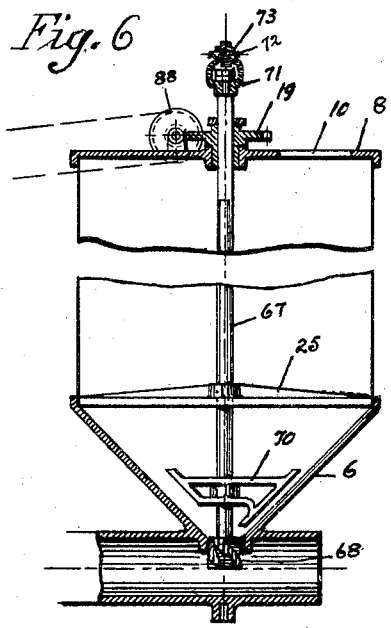
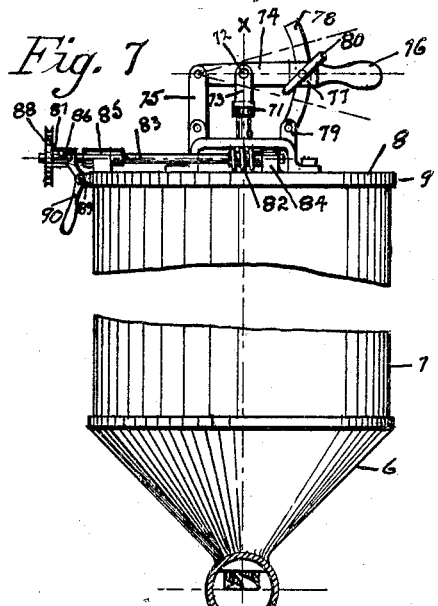
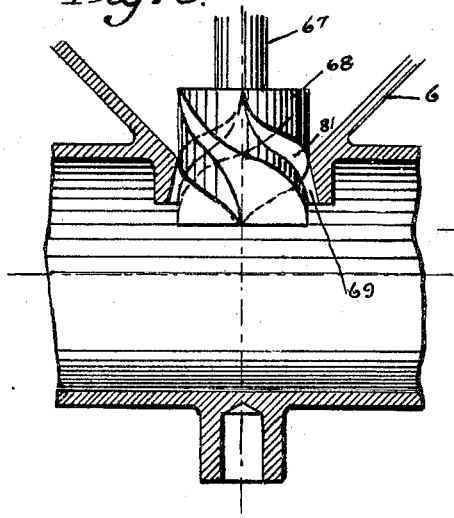
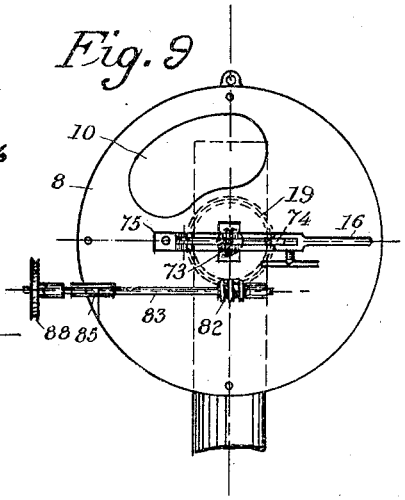
WITNESSES:
C. C. Griffing
H. J. Chase
INVENTORS
George C. Johnson and Charles E. Johnson
BY
Arthur C. Brown
ATTORNEY.

No. 793,526.

Patented June 27, 1905.

UNITED STATES PATENT OFFICE.

GEORGE C. JOHNSON AND CHARLES E. JOHNSON, OF KANSAS CITY, MISSOURI.

DUST-SPRAYING MACHINE.

SPECIFICATION forming part of Letters Patent No. 793,526, dated June 27, 1905.

Application filed September 21, 1903. Serial No. 174,121.

*To all whom it may concern:*

Be it known that we, GEORGE C. JOHNSON and CHARLES E. JOHNSON, citizens of the United States, residing at Kansas City, in the county of Jackson and State of Missouri, have invented certain new and useful Improvements in Dust-Spraying Machines; and we do declare the following to be a full, clear, and exact description of the invention, such as will enable others skilled in the art to which it appertains to make and use the same, reference being had to the accompanying drawings, and to the figures of reference marked thereon, which form a part of this specification.

Our present invention relates to a machine for projecting a spray of insecticide or fungicide powder or dust on trees, vineyards, tobacco, hops, cotton-fields, &c., and is an improvement over Patent No. 684,261, issued to us October 8, 1901.

The objects of our present invention are, first, to provide improved means for holding the valve-rod depressed; second, to provide improved agitator-blades; third, to provide a more simple and substantial construction of the fan-shell, dust-hopper, and fan-shell nozzle; fourth, to provide an improved feeding means, and, fifth, to provide means whereby the entire sprayer may revolve around its driving-gear, the parts retaining the same relative position in connection with said driving-gear at whatever angle the machine is turned.

Further objects of our invention are to provide many improved details of structure which we have developed in the practical working of our machine and which will be hereinafter described, and pointed out in the accompanying drawings, in which—

Figure 1 is a side elevation of the working parts of a machine constructed in accordance with our invention, the dust-hopper and blower-nozzle being in central vertical section to show the stirrer-blades, the valve, and the valve-operating mechanism. Fig. 2 is an end view, partly in section, showing the operating mechanism. Fig. 3 is a top plan view of the entire machine. Fig. 4 is a detail view of the means for adjusting the valve controlling the flow of dust from the dust-hopper. Fig. 5 is a sectional view of same. Fig. 6 is a sectional view on the line $x\ x$, Fig. 7, showing the stirrer-blades and a modification of the means for feeding the dust from the hopper. Fig. 7 is an end view of the hopper, showing the means operating the stirrer-blades and valve. Fig. 8 is an enlarged detail view of the modification of the feeding means, showing parts of the hopper and blower-nozzle in section. Fig. 9 is a top plan view of the hopper.

Referring more in detail to the drawings, in Figs. 1 and 2, 3 represents a base-board, to which are rigidly attached the base 4 and circular track 5. Supported on track 5 is a dust-hopper comprising a conical bottom 6, a drum 7, seated in an annular shoulder on the upper end of bottom 6, and a lid 8, having a depending annular flange 9, embracing the upper edge of drum 7. Lid 8 is secured to drum 7 by stud-bolts or other suitable means. This hopper is a receptacle for the dust or powder which is placed therein through an opening 10 in lid 8. The flow of dust from the hopper is regulated by a puppet-valve 11, secured on the lower end of a valve-rod 12. A depending annular flange 13 on bottom 6 forms a seat for valve 11. To prevent the dust from packing in the hopper-bottom, we employ an agitator comprising arms 14 14', having a hub 15, secured on a vertical tubular shaft 16. Arm 14' extends almost to the inner surface of conical bottom 6 and carries an arm 17, which revolves therewith and prevents the packing of the dust in the hopper. On the lower end of side 17 and extending downwardly into the valve-neck is a finger 91, which, revolving with side 17, prevents the dust from clogging said neck. The arms 14 14' are shaped substantially as shown, and there may be a series of said arms locked at different angles on shaft 16. Shaft 16 is made tubular in order to form a channel for valve-rod 12, which cannot be placed outside of said shaft on account of the revolving arms 14 14'. Tubular shaft 16, on which said arms are mounted, extends through a circular opening in brace 25, seated on the shoulder at the top of conical bottom 6 of the hopper and up through a circular opening in lid 8, said openings being large enough to permit free rotation of the shaft, but snug enough to prevent its rattling or wabbling. On said shaft, above the opening in lid 8, is secured a worm gear-wheel 19, the teeth of which are preferably inclined and curved, as shown, to fit the worm 20, by which they are engaged. Worm 20 is mounted on a horizontal shaft 21, the end of which adjacent to said worm is journaled in a perforated lug 22, integral with lid 8. Shaft 21 extends a short distance beyond the sides of the hopper at a right angle to the blower-nozzle and is journaled near its outer end in a perforated lug 23 near the edge of and integral with lid 8. On the outer end of shaft 21 is mounted a pulley 24. Passing through base 4 and journaled in the sides thereof is a shaft 26. Within said base and secured to shaft 26 is a beveled gear-wheel 27. On its outer end shaft 26 carries a tight and loose pulley 30 30'. Lateral movement of shaft 26 is prevented by means of annular collars 28 29, secured to said shaft at opposite sides of base 4. Meshing with bevel gear-wheel 27 is a bevel-pinion 31, secured to a perpendicular shaft 32, said shaft being journaled in openings in the top and bottom of a standard 33. To give greater rigidity to standard 33, we prefer to make same integral with base 4. At the upper end of shaft 32 is secured a bevel gear-wheel 34. Meshing with bevel gear-wheel 34 is a bevel-pinion 35, secured to a horizontal shaft 36, which is journaled near one end in a journal-box 37 on bracket 38 and carries on said end a pulley 39, which connects with pulley 24 by means of a belt 40. Near its opposite end shaft 36 is journaled in a journal-box 41 on bracket 42, said bracket being preferably integral with and a projection of blower-shell 43, but may be mounted on a base on said shell. Near the end of shaft 36, which projects through journal-box 41, is attached a pulley 44, which connects with a pulley 45 by means of belt 46. Pulley 45 is secured to a horizontal shaft 47, which passes through openings in the sides of blower-shell 43, and is mounted in bracket-bearings 48 on the respective sides of said shell. Said brackets are preferably made integral with the sides of said shell. Within shell 43 and secured to shaft 47 is a rotary fan adapted to create a draft through the nozzle 49 of said shell. Blower-shell 43, projection 42, and shaft 36, with the parts mounted thereon, are supported by arms 38 and 53, loosely mounted on standard 33, arm 38 being provided with a journal-box 51, resting on an annular flange 50 on standard 32, and arm 53 with a journal-box 52, resting on base 4. The dust-hopper and blower-shell nozzle are supported by a roller 55, mounted in a yoke 54, which is secured to the under side of nozzle 49. Roller 55 travels on a circular track 5, secured to base 3. For purposes of economy, convenience, and solidity we prefer to make the blower-shell 43, bracket 42, nozzle 49, and conical bottom 6 integral. 93 is a cap secured to blower-shell 43 and is adapted to be removed for the purpose of repairing the machinery within the blower should such repairs be necessary. 57 is a brace integral with the blower-shell and hopper-bottom and joining said parts for the purpose of imparting greater rigidity thereto.

In Figs. 4 and 5 we show a modification of the means for regulating the feed of dust from the hopper to the blower-nozzle. As in our previous machine valve-rod 12 turns within the tubular shaft 16 and carries a puppet-valve 11 at its lower end. In the modified arrangement rod 12 extends upwardly through a perforation in the center of cap 58 on the upper end of shaft 16. The upper portion of rod 12 is screw-threaded to hold a rotatable knob or hand-nut 59, having a tubular lower portion 60. Resting on cap 58 of shaft 16 and coiled around rod 12 is an expansion-spring 61, said spring being adapted to fit within the lower tubular portion 60 and rest against shoulders 62 of knob 59. Near the lower end of tubular portion 60 is a lug 63, carrying a pin 64. A little underneath knob 59 is a vertical standard 65, provided with a series of notches 65' for engaging pin 64. Said standard may be of any suitable material and secured to the lid of the hopper, but is preferably made integral therewith. Knob 59 being supported by spring 61 supports the valve-rod 12 and valve 11, and owing to the upward pressure of said spring valve 11 is normally closed—that is, in contact with the valve-seat 13. Knob 59 may be secured in any desired position on rod 12 in order to adjust the tension of spring 61 to provide for weakening of said spring. Knob 59 is threaded to correspond with the screw-threads on valve-rod 12, and when it is desired to adjust said knob it is raised or lowered on rod 12 by turning on said threads. When knob 59 is turned to the desired position on rod 12, it is locked in such position by means of a nut 92 on the upper end of the rod. When pin 64 is free from the standard 65, spring 61 forces knob 59 up to the limit of expansion of said spring, and knob 59 being secured to rod 12 draws said rod upwardly, which in turn draws valve 11 upwardly against the face 13, thereby shutting off the feed from the hopper. When pin 64 is placed in the upper notch 65', said valve is held open a short distance and is held open a correspondingly greater distance as it is placed in each of the lower notches. Should the opening when the pin is placed in the first of notches 65' be too great, knob 59 is screwed down on rod 12 and locked by nut 92 in such position as to bring pin 64 a shorter distance above said notch, so that when knob 59 is forced down and pin 64 is lodged in said notch valve 11 will be lowered the desired distance below face 13. In this way the feed may be regulated so that a very small amount of dust escapes from the hopper.

In Figs. 6, 7, 8, 9 we show a modification of the feeding means. Attached to a shaft 67 is a worm-screw 68, fitting neck 69 at the bottom of the hopper. Resting on the shoulders at the top of conical bottom 6 is a brace 25 of the same kind and serving the same purpose as that used with the puppet-valve feed previously described. Shaft 67 passes upwardly through an opening in brace 25 and through an opening in lid 8. Attached to shaft 67 are stirrer-blades 70 of any suitable pattern, but which are preferably extended almost to the sides of conical bottom 6 to prevent packing of the dust therein. Worm gear-wheel 19 is tightened on shaft 67, so that as said shaft is operated by means to be hereinafter described, shaft 67 revolves in the hopper, thereby revolving stirrer-blades 70 and worm-screw 68. Shaft 67 extends a short distance above gear-wheel 19 and is loosely mounted in a socket-bearing 71, which is carried by a depression-lever 74, by means of a pivot-pin 72, extending transversely through a pair of ears 73 on the upper part of said bearing and through a perforation in said lever. One end of lever 74 is pivotally connected with a standard 75, said standard being rigidly mounted on lid 8 of the hopper. At its opposite end lever 74 is provided with a handle 76. Midway between handle 76 and ears 73 is a box 77, engaging a segmental portion 78 of a standard 79, rigidly mounted on lid 8 of the hopper. By means of handle 76 lever 74 may be raised or lowered to the desired position and secured in such position by means of a set-screw 80 in box 77. When it is desired to shut off the feed, lever 74 is secured in the position indicated by the dotted lines at the lower end of segmental portion 78, Fig. 7. When lever 74 is forced downwardly to such position, shaft 67, being attached thereto, is also forced downwardly until the top of the screw 68 is flush with the top of neck 69, thereby closing said neck. The recesses 81 in screw 68 are very narrow at the top and gradually widen toward the bottom, so that should a small feed be desired lever 74 is raised a short distance on segmental portion 78, thereby raising shaft 67 and screw 68 until a part of recess 81 is exposed to the dust in the hopper, which entering said recess drops through the gradually-widening opening into the nozzle of the blower. With this arrangement a direct feed from the hopper to the nozzle may be procured, thus obviating clogging of the neck of the hopper. Should a greater feed be desired, lever 74 is secured in a higher position on portion 78, the feed being thus increased until lever 74 reaches the point indicated by the upper dotted lines, when the bottom of valve 68 will be on a level with the top of neck 69 and neck 69 be practically open. With the screw in the latter position coarse or lumpy fertilizers may be fed through said neck. Shaft 67 is revolved by means of a worm 82 engaging a worm gear-wheel 19. Worm 82 is secured to the inner end of a horizontal shaft 83, journaled in lugs 84 85 on hopper-lid 8. Near the outer end of shaft 83 is a collar 86, riding in a groove on said shaft and provided at its outer end with a spiral-jaw clutch-face adapted to engage a corresponding face on the inner side of an annular flange 87 on a loose pulley 88, mounted on the outer end of shaft 83. Pivoted in a pair of ears 89 on lid 8 is a bell-crank lever 90, the upper arm of which is secured to a loose ring on collar 86. By raising the lower arm of lever 90 the clutch on collar 86 is thrown out of connection with the clutch on flange 87 and pulley 88 turns loosely on shaft 75. By lowering the lower arm of lever 90 collar 86 is forced outwardly until the jaws on its outer face engage the jaws on the inner face of the flange 87, thereby turning collar 86 and shaft 83. Attached to the outer end of nozzle 49 is a discharge-tube of the same construction as that shown in our previous patent.

In the use of this machine the base is secured to a base-board, which is placed in the bottom of a wagon, together with a small engine or motor, or should it be desired to operate the machine by means of a sprocket-gear on the wagon-axle said engine may be dispensed with. The dust-hopper is filled with a dust which has previously been prepared and the wagon driven to the orchard or vineyard. When the orchard is reached, the power is turned on and the blower-fan and stirrers started in operation. The feed-valve is opened sufficiently to procure the desired feed of dust, which dropping into the nozzle is forced by the draft from the blower up through the discharge-tube and spreads in a spray over the trees. The discharge-tube is attached to the nozzle of the blower in the manner shown in our previous patent, the joint being sufficiently flexible to permit the tube being turned, so that the dust will reach trees in a limited circuit on each side of the wagon; but should it be desired to reach a point beyond that circuit the entire machine being hung by brackets on the standard on the base and supported by the roller riding on the circular track, as previously described, may be turned so that the dust from the discharge-tube can reach any desired point within a radius limited by the power of draft from the blower.

We do not wish to be understood as limiting ourselves to the exact details of structure herein shown and described, inasmuch as the same may be varied without departing from the spirit of our invention.

Having thus described our invention, what we claim as new therein, and desire to secure by Letters Patent, is—

1. In a dust-spraying machine, a dust-receptacle having an opening in the bottom thereof, and an agitator rotatably mounted within said receptacle and having an arm extending to said bottom opening and parallel to the inner wall of the receptacle, said arm having at its lower terminus a finger projecting into said bottom opening and parallel to the wall of the same.

2. In a dust-spraying machine, a dust-receptacle, a valve-seat in the bottom of said receptacle, a valve arranged beneath said valve-seat and having a valve-rod extending upwardly through said receptacle, a notched standard mounted on said receptacle, a knob mounted on said rod, and means on said knob for engaging the notches in said standard.

3. In a dust-spraying machine, a dust-receptacle having an opening in the bottom thereof, a valve arranged to close said opening, a rod on said valve extending upwardly through said receptacle and being screw-threaded on its upper end, a notched standard mounted on said receptacle, a knob having a threaded perforation, carried by said rod, a lug or pin on said knob adapted to engage said notched standard, and means for retaining said knob in a desired position on said rod.

4. In a dust-spraying machine, a dust-receptacle having an opening in the bottom thereof, a tubular shaft within said receptacle and having a cap on the upper end thereof, a rod mounted within said shaft and passing through a cap on the upper end thereof, a hand-nut having a lower tubular portion, mounted on said rod near the upper end thereof, a nut mounted on said rod above said hand-nut, a coiled spring around said rod adapted to rest on the cap on the upper portion of said shaft and fitting within the lower tubular portion of the hand-nut, a pin or lug on said hand-nut, and a notched or toothed standard on the top of said receptacle.

5. In a dust-spraying machine, a dust-receptacle comprising a conical bottom with an opening in the bottom thereof and having an annular flange near the top thereof, and a drum seated on said annular flange, a lateral brace seated on said flange and having a perforation therein, and a vertical rotatable shaft within said receptacle and extending through the perforation in said brace.

6. In a dust-spraying machine, a suitable base, a blower-shell mounted on said base, a nozzle extending from said blower-shell, and a dust-receptacle mounted above said nozzle, said blower-shell, nozzle, and dust-receptacle being adapted to revolve around said base.

7. In a dust-spraying machine, a suitable base, a blower-shell mounted on said base, a nozzle extending from said blower-shell, a dust-receptacle mounted above said nozzle a depending yoke on said nozzle, and a roller mounted in said yoke.

8. In a dust-spraying machine, a suitable base, a standard mounted on said base, annular flanges on said standard, brackets rotatably mounted on said standard and supported by said flanges, a blower-shell carried by said brackets, a nozzle extending from said blower-shell, and a dust-receptacle mounted above said nozzle.

9. In a dust-spraying machine, the combination of a dust-receptacle having a conical bottom with an opening therein, a blower-shell, a fan revolving within said shell, a standard on the upper part of the blower-shell, a nozzle extending outwardly from said shell and connecting with the conical bottom of the hopper, the said blower-shell, nozzle, and conical bottom being integral.

10. In a dust-spraying machine, the combination of a dust-receptacle having a conical bottom with an opening therein, a blower-shell, a fan revolving within said shell, brackets on each side of said shell for supporting the fan-shaft, a standard on the upper part of said shell, a nozzle on said shell, connecting with said conical bottom, a brace connecting said conical bottom and said blower-shell, said blower-shell, nozzle, brackets, brace, and conical bottom being integral.

In testimony whereof we affix our signatures in presence of two witnesses.

GEORGE C. JOHNSON.
CHARLES E. JOHNSON.

Witnesses:
FREDERICK J. CHASE,
O. H. McQUARY.